US010078768B2

(12) United States Patent
Legrand et al.

(10) Patent No.: US 10,078,768 B2
(45) Date of Patent: Sep. 18, 2018

(54) CARD OR MEDIA COMBINED READERS FEATURING SINGLE TARGET AREA

(71) Applicant: Conduent Business Services, LLC, Dallas, TX (US)

(72) Inventors: Francois Legrand, Guilherand-Granges (FR); Guillaume Le Bidan, La Voulte sur Rhone (FR)

(73) Assignee: Conduent Business Services, LLC, Dallas, TX (US)

( * ) Notice: Subject to any disclaimer, the term of this patent is extended or adjusted under 35 U.S.C. 154(b) by 0 days.

(21) Appl. No.: 15/429,772

(22) Filed: Feb. 10, 2017

(65) Prior Publication Data

US 2018/0129836 A1    May 10, 2018

(30) Foreign Application Priority Data

Nov. 9, 2016  (EP) .................... 16306472

(51) Int. Cl.
| | |
|---|---|
| *G06K 5/00* | (2006.01) |
| *G06K 7/10* | (2006.01) |
| *G06K 7/00* | (2006.01) |
| *G07F 17/42* | (2006.01) |
| *G06K 7/14* | (2006.01) |
| *G07F 7/08* | (2006.01) |
| *G06Q 20/18* | (2012.01) |

(52) U.S. Cl.
CPC ....... *G06K 7/10297* (2013.01); *G06K 7/0004* (2013.01); *G06K 7/1413* (2013.01); *G06Q 20/18* (2013.01); *G07F 7/0873* (2013.01); *G07F 17/42* (2013.01)

(58) Field of Classification Search
CPC ............ G06K 5/00; G06K 19/00; G06K 7/10; G06K 7/14; G06F 17/00; G03B 7/08
USPC ................. 235/380, 375, 487, 462.1, 462.24
See application file for complete search history.

(56) References Cited

U.S. PATENT DOCUMENTS

| | | |
|---|---|---|
| 5,594,233 A | 1/1997 | Kenneth et al. |
| 2005/0092831 A1 | 5/2005 | Sandoval et al. |
| 2008/0236991 A1 | 10/2008 | Arakaki et al. |
| 2012/0273574 A1* | 11/2012 | Shearer ................ G07D 7/0026 235/462.41 |
| 2012/0278137 A1 | 11/2012 | Dixon et al. |
| 2013/0320087 A1* | 12/2013 | Moran ............. G06K 19/06037 235/440 |
| 2015/0287289 A1 | 10/2015 | Lewis et al. |
| 2017/0276289 A1* | 9/2017 | Phillips .................. F16M 11/04 |

* cited by examiner

*Primary Examiner* — Edwyn Labaze
(74) *Attorney, Agent, or Firm* — Fay Sharpe LLP

(57) ABSTRACT

A card validator or, more generally, a combined reader includes a plurality of readers for validating a corresponding plurality of card and document types. The validator or combined reader includes the housing containing the plurality of readers wherein the readers are independent from each other and spaced at different locations within the housing and disposed therein to read cards presented to the card validator or combined reader at a single target area. The housing is configured to direct a user presentation for the provided card at the signal target area. Each of the individual readers is modular within the housing and is disposed within a modular reception location therein for facilitating performance certification of the modular readers therein separately from certification of the entire multi-card validator system.

6 Claims, 2 Drawing Sheets

CARD OR MEDIA COMBINED READERS FEATURING SINGLE TARGET AREA

TECHNICAL FIELD

The presently disclosed embodiments are directed to validator systems or more generally readers for reading the like of travel and personal documents such as payment and identity cards via optical or electromagnetic scanning and has particular application as a system for recognizing fare media in transit systems.

BACKGROUND

Card readers such as bar code scanners and contactless or EMV contactless smart card readers are well known. Each employs a reliable technology to read the card or document being presented. Bar code readers will use an optical beam to discern the presented bar code. Contactless or EMV contactless readers communicate with an embedded chip for ascertaining an identity code as well as other data. As a result of the different technologies for different card reader systems, the physical configuration of card validator or, more generally, card reader systems have developed to include a target area for card reading that is particularly suitable and effective for the reading technology involved. For example, a bar code reader must facilitate a spacing from the originating point of the bar code optical beam to accommodate transmission and reception across the extent of the subject bar code and its reflection back to an optical/scanner. Thus a bar code reader will seek to direct the user to place the physical item including the bar code at a location to accommodate such spacing. Alternatively, a contactless or an EMV contactless smart card reader needs no such spacing, and typically only requires the contactless or EMV contactless card to be in contactless close proximity to the electromagnetic scanner for ascertaining the desired embedded chip data. The locations for positioning the subject cards or documents to be read are typically referred to as a "target area" and such target areas are intentionally disposed for easy recognition and access by members of the public who would be using such systems.

In card validator systems that are typically employed in public transport, in order to achieve the primary objectives of reliability and speed of processing, such systems have usually employed only a single type of fare media, that is for loading access to a loading platform, individuals must use a single form of card for validation that is selected by the transit system. Where multiple different fare media types are employable, typically a kiosk must be accessed as a preparatory process, or the validators themselves feature separate validation target areas for different reader technology. It has been particularly noticeable that where multiple target areas are presented, the location that where one of the different media is to be presented is not readily obvious to a user.

Yet another problem that exists particularly with regard to EMV validator systems is that the technological evolutions and updates of EMV function readers may occur relatively more rapidly than updates to the overall plural systems (particularly in transport systems) in which they are embedded. Therefore, it can be an advantage to be able to change/update only the EMV reader without changing the bar code reader.

SUMMARY

According to aspects illustrated herein, there is provided an apparatus and system comprising a card validator including a plurality of readers for validating a corresponding plurality of card types. The validator includes a housing containing the plurality of readers wherein the readers are spaced at different locations within the housing and disposed therein to read cards presented to the card validator at a single target area. The housing is configured to direct a user presentation of a provided card at the single target area.

One disclosed feature of the embodiments is that the readers may comprise a contactless or an EMV contactless reader and a bar code reader and the contactless or the EMV contactless reader is disposed at a housing location wherein a beam from the bar code reader is focused on a contactless or an EMV target area of the contactless or EMV contactless reader.

Another disclosed feature of the embodiment is that the contactless or EMV contactless reader is modular and is disposed within a modular reception location in a housing for facilitating performance certification of the modular EMV contactless reader separately from certification of the entire card validator system.

DETAILED DESCRIPTION

Figure 1:
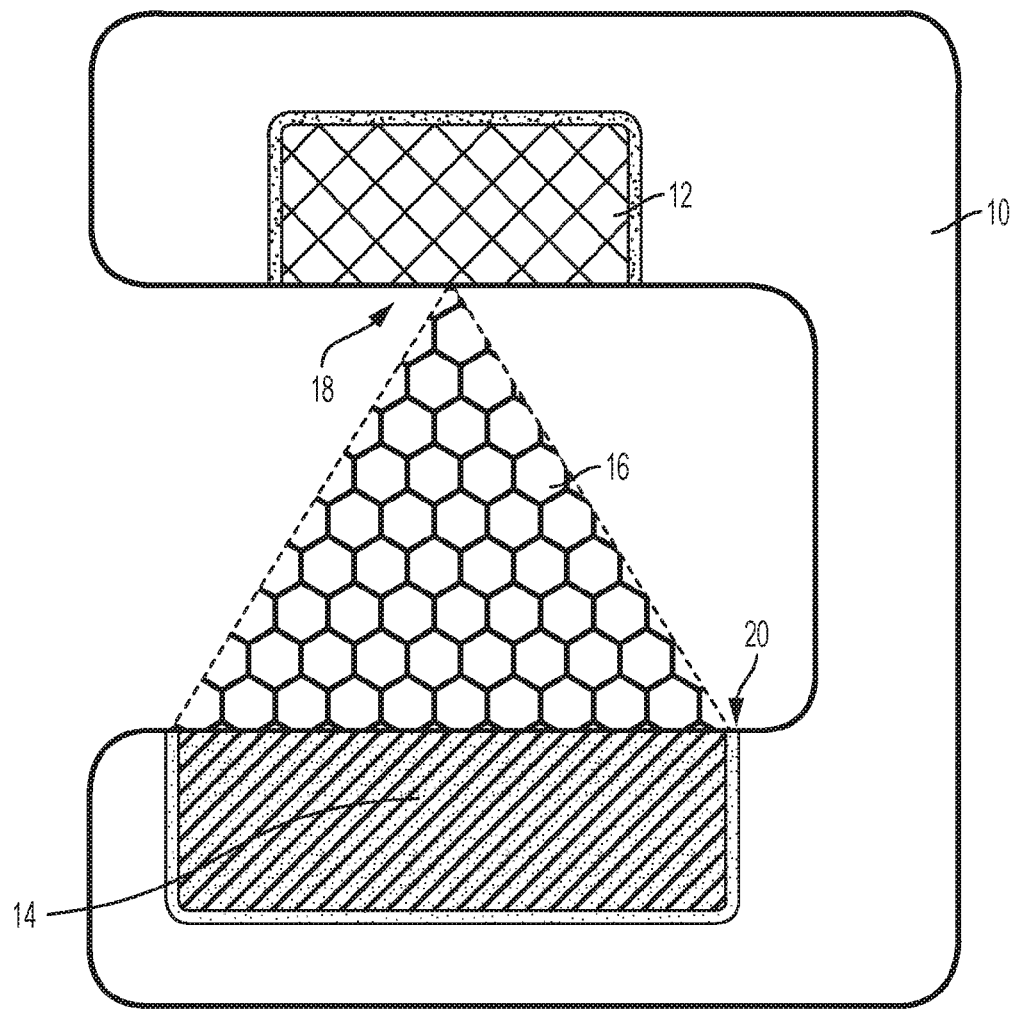
FIG. 1 is a perspective view of an embodiment of a card validator comprising a combined EMV contactless validator and bar code validator; and, FIG. 2 is a schematic side view of another embodiment illustrating different embedded readers.

FIG. 1 is essentially a schematic view of a side cross-sectional cut of a validator or, more generally, a combined reader device including a housing 10 in which is embedded a bar code reader 12 and a contactless or contactless EMV smart card reader 14. The particular readers that are embedded are merely exemplary, and it is within the scope of the embodiments to include other reader systems such as optical scanners, biometric detectors or document readers and the like. The Figure shows that the bar code reader 12 emits an optical beam 16 from a source point 18 to an opposed surface area 20 immediately adjacent the EMV reader 14. Thus, the structural dispositions and relative positionings of the bar code reader 12 and contactless or EMV contactless reader 14 are that they share a single target area for either a bar code item to be read or an EMV card or contactless cards/media to be read. Such reading is typically contactless but the natural tendency of a user is to place either card type in the spacing between the readers 12 and 14 near the lower reader 14 due to natural ergonomic tendencies. Of course, the embodiments are not limited to a particular disposition of any single target area in such a system, but that a single general area within the user accessible locations for allowing the reader to complete its task is provided.

Another feature of the present embodiments is that the EMV reader 14 is modular with respect to the housing 10. In other words, it can be removed and installed as a modular component, which component can be certified in accordance with evolutionary upgrades without having necessary certification of the entire installation including the bar code reader 12. By modular it is meant that there is an area within the housing into which the EMV reader 14 can be effectively loaded and connected to whatever conventional wiring needs are required, and may be selectively removed for upgrading and replacement.

Figure 2:
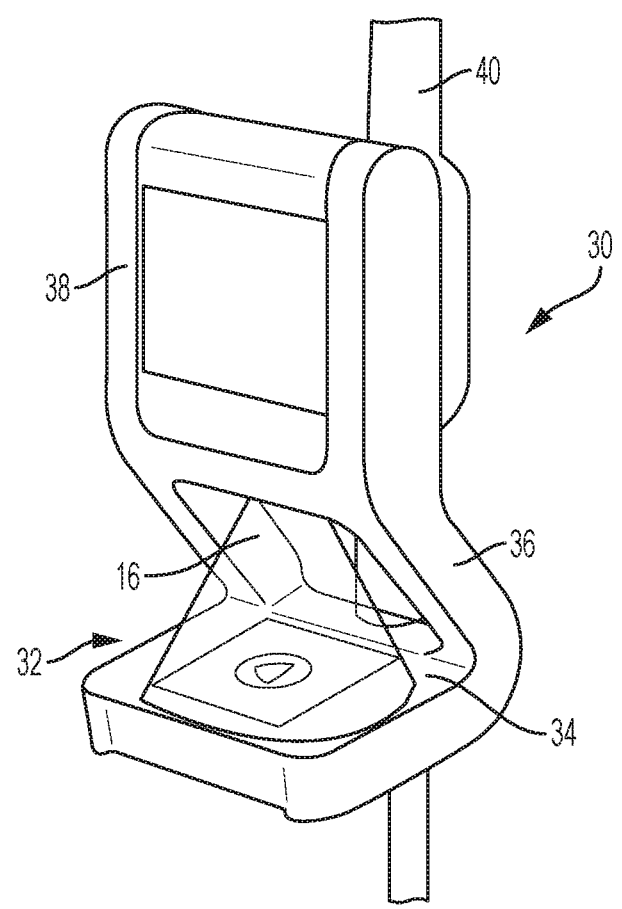

FIG. 2 is an embodiment of an onboard validator 30 such as may be installed within an operating vehicle in a transit system. Its physical construction is slightly different than the schematic embodiment of FIG. 1 in that the target area 32 adjacent validation base plate 34 covering the contactless or EMV contactless 14 (not shown) is ergonomically located by the relative disposition of the angular frame 36 and the card holder-facing user interface 38. The bar code beam 16 is illustrated as being directed from a lower portion of the user interface 38 which would contain the bar code reader 12 (not shown). Such a compact onboard validating system could be readily mounted on a support bar 40 conveniently located near an entry point of the vehicle (not shown).

The embodiments are applicable to other applications i.e. on-board or stationary/platform validators, kiosks, ticket vending machines, and other applications where any combination of a (EMV or not EMV) contactless reader and a bar code reader or optical scanners, biometric detectors, document readers and the like, can be freely combined so that the patron will use a single target to present their media, whatever the media may be e.g. card, NFC smartphone, card with barcode, smartphone with barcode.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A card validator including a plurality of readers for validating a corresponding plurality of card types, comprising:
   a housing containing the plurality of readers including a contactless reader, an EMV contactless reader or a barcode reader wherein the readers are spaced at different locations within the housing and disposed therein to read cards presented to the card validator at a single target area and wherein the plurality of readers are disposed at a housing location wherein a beam from the barcode reader is focused on an EMV target of the EMV contactless reader;
   wherein the housing is configured to direct a user presentation of a card to be read at the single target area; and
   wherein the single target area comprises a spaced reading area between a source point of an optical beam from the bar code reader and an opposed surface area of the housing immediately adjacent the EMV readers for variable disposition and positionings of the user presentation of the card to be read in the spaced area.

2. The card validator of claim 1 wherein the contactless reader is modular and disposed within a modular reception location in the housing.

3. A validating system for documents presented by a user for reading, comprising:
   a housing for a plurality of reading devices for performing the reading wherein the devices are disposed at different locations in the housing to share a single target area for document disposition by the user for the reading, and wherein the single target area is disposed at a housing location apparent to the user in a spacing between the plurality of reading devices; and
   wherein the single target area comprises a spaced reading area in the spacing in which distinct documents for distinct ones of the reading devices are positioned for variable disposition and positionings of a user presentation of the document to be read for the reading.

4. The validating system of claim 3 comprising an on-board or stationary platform validator, kiosk or ticket vending machine.

5. The validating system of claim 3 wherein the reading devices comprise optical scanners, biometric detectors, document readers, bar code readers, contactless card readers, contactless EMV smart card readers or smartphones readers.

6. The validating system of claim 3 wherein the reading devices are modular with respect to the housing for removal and installation as a modular component thereof.

\* \* \* \* \*